(12) United States Patent
Lee et al.

(10) Patent No.: US 8,194,145 B2
(45) Date of Patent: Jun. 5, 2012

(54) METHOD FOR RESIZING IMAGE IN WIRELESS TERMINAL AND WIRELESS TERMINAL ADAPTED FOR RESIZING

(75) Inventors: Moon-Heui Lee, Gumi-si (KR); Jae-Min Kim, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 794 days.

(21) Appl. No.: 11/376,303

(22) Filed: Mar. 16, 2006

(65) Prior Publication Data

US 2006/0250506 A1 Nov. 9, 2006

(30) Foreign Application Priority Data

May 9, 2005 (KR) ........................ 10-2005-0038538

(51) Int. Cl.
*H04N 5/235* (2006.01)
*G09G 5/00* (2006.01)
(52) U.S. Cl. ..................... 348/222.1; 345/667
(58) Field of Classification Search ............... 348/222.1; 345/667, 670, 815
See application file for complete search history.

(56) References Cited

U.S. PATENT DOCUMENTS

| | | | |
|---|---|---|---|
| 5,142,363 A | 8/1992 | Johary et al. | |
| 6,407,775 B1 * | 6/2002 | Frink et al. | 348/443 |
| 6,839,068 B2 * | 1/2005 | Yoshioka | 345/670 |
| 7,142,221 B2 * | 11/2006 | Sakamaki et al. | 345/592 |
| 7,250,968 B2 * | 7/2007 | Ito | 348/240.2 |
| 7,271,838 B2 * | 9/2007 | Suekane et al. | 348/333.02 |
| 7,307,643 B2 * | 12/2007 | Moroo et al. | 345/667 |
| 7,411,613 B2 * | 8/2008 | Honma | 348/222.1 |
| 7,590,397 B2 * | 9/2009 | Kondo et al. | 455/161.2 |
| 2001/0040585 A1 * | 11/2001 | Hartford et al. | 345/667 |
| 2003/0001862 A1 | 1/2003 | Chu et al. | |
| 2003/0090497 A1 | 5/2003 | Yoshioka | |
| 2004/0201721 A1 * | 10/2004 | Baharav et al. | 348/222.1 |
| 2005/0099509 A1 * | 5/2005 | Kobayashi | 348/229.1 |
| 2005/0104909 A1 * | 5/2005 | Okamura et al. | 345/698 |
| 2005/0143124 A1 | 6/2005 | Kennedy et al. | |
| 2006/0176376 A1 * | 8/2006 | Dyke et al. | 348/222.1 |

(Continued)

FOREIGN PATENT DOCUMENTS

CN 1274207 11/2000

(Continued)

OTHER PUBLICATIONS

Method for Performing Zoom; IBM Technical Disclosure Bulletin; vol. 37 No. 01 Jan. 1994.

*Primary Examiner* — Trung Diep
(74) *Attorney, Agent, or Firm* — Roylance, Abrams, Berdo & Goodman, LLP

(57) ABSTRACT

An apparatus and method for converting an image in a wireless terminal are disclosed. An apparatus and method for resizing an image output from a camera module such that the image has a size suitable for a display unit in a wireless terminal are provided. The method involves determining a size of an image output from a camera module, resizing the size of the image output from the camera module to a size suitable for a display unit when the size of the image output from the camera module differs from the size of the image to be output through the display unit, and outputting the resized image. The method involves determining a size of an image output from a camera module, and resizing a 720×480 image to a 320×240 image to be output through a display unit when the camera module has output the 720×480 image, and outputting the 320×240 image.

12 Claims, 4 Drawing Sheets

U.S. PATENT DOCUMENTS

2006/0221198 A1* 10/2006 Fry et al. .................... 348/222.1

FOREIGN PATENT DOCUMENTS

| CN | 1555196 A | 12/2004 |
| --- | --- | --- |
| EP | 1 052 598 A2 | 11/2000 |
| JP | 2001028619 | 1/2001 |
| JP | 2004-096166 | 3/2004 |
| KR | 2003-83404 | 10/2003 |
| WO | WO 2004/023795 | 3/2004 |

* cited by examiner

METHOD FOR RESIZING IMAGE IN WIRELESS TERMINAL AND WIRELESS TERMINAL ADAPTED FOR RESIZING

PRIORITY

This application claims the benefit under 35 U.S.C. 119(a) of Korean application filed in the Korean Intellectual Property Office on May 9, 2005 and assigned Serial No. 2005-38538, the entire disclosure of which is hereby incorporated by reference.

BACKGROUND OF THE INVENTION

1. Field of the Invention

The present invention relates to an apparatus and method for converting an image size in a wireless terminal. More particularly, the present invention relates to a method for resizing an image output from a camera module such that the image has a size suitable for a display unit in a wireless terminal.

2. Description of the Related Art

Wireless terminals facilitate the transmittal and receipt of image data. Therefore, wireless terminals can store an image received from a base station and transmit an acquired image to the base station. Wireless terminals include a camera for photographing an image and a display unit for displaying an image photographed by the camera. The camera may include a CCD (Charge-Coupled Device) or a CMOS (Complementary Metal Oxide Semiconductor) sensor and the display unit may include an LCD (Liquid Crystal Display). Where camera devices are smaller, the camera modules also show a tendency to be smaller. The wireless terminal can photograph an image to be displayed as a moving picture or a still picture, and can transmit a photographed image to the base station.

Also, the wireless terminal is equipped with a camera module for processing high resolution image data so that the wireless terminal can process and store image data of a high resolution to the same degree as a typical digital camera. The camera module, which is included in the wireless terminal in order to process a high resolution, receives a 640×480 image from a built-in sensor and outputs a 720×480 image through the camera module signal processing unit. In this case, the image is output using an interlaced scanning scheme which is a scanning scheme for the television. According to the interlaced scanning scheme, an image is divided into odd-numbered line images and even-numbered line images and is output. According to the interlaced scanning scheme, one frame having a 720×480 image is output as two frames, each having a 720×240 image.

Also, an image obtained by a sensor using a variable number of frames has a low fps (frames per second) for a dark area, but the signal processing unit of the camera module for processing a high resolution outputs an image having fixed 30 frames, regardless of the number of frames output from the sensor. Since the image is output through the interlaced scanning scheme, an image having 60 frames is output as two groups of 30 frames.

However, when the wireless terminal includes a display unit of outputting a 320×240 image, if the camera module outputs a 720×480 image to the display unit, the aspect ratio of the image is mismatched with that of the display unit, thereby causing a distortion of the image.

Accordingly, there is a need for an improved method for resizing an image output from a camera module with a size suitable for a display unit in a wireless terminal.

SUMMARY OF THE INVENTION

An aspect of exemplary embodiments of the present invention is to address at least the above problems and/or disadvantages and to provide at least the advantages described below. Accordingly, exemplary embodiments of the present invention have been made to solve the above-mentioned problems occurring in the prior art, and an object of exemplary embodiments of the present invention is to provide a method for resizing an image output from a camera module so that the image has a size suitable for a display unit in a wireless terminal.

To accomplish this object, in accordance with one aspect of an exemplary embodiment of the present invention, a method for converting an image size in a wireless terminal is provided. A size of an image output from a camera module is determined and resized to a size suitable for a display unit when the size of the image output from the camera module differs from the size of the image to be output through the display unit. The resized image is then output.

In accordance with another aspect of exemplary embodiments of the present invention, a method for converting an image size in a wireless terminal is provided. A size of an image output from a camera module is determined and a 720×480 image is resized to a 320×240 image to be output through a display unit when the camera module has output the 720×480 image, and the 320×240 image is output.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
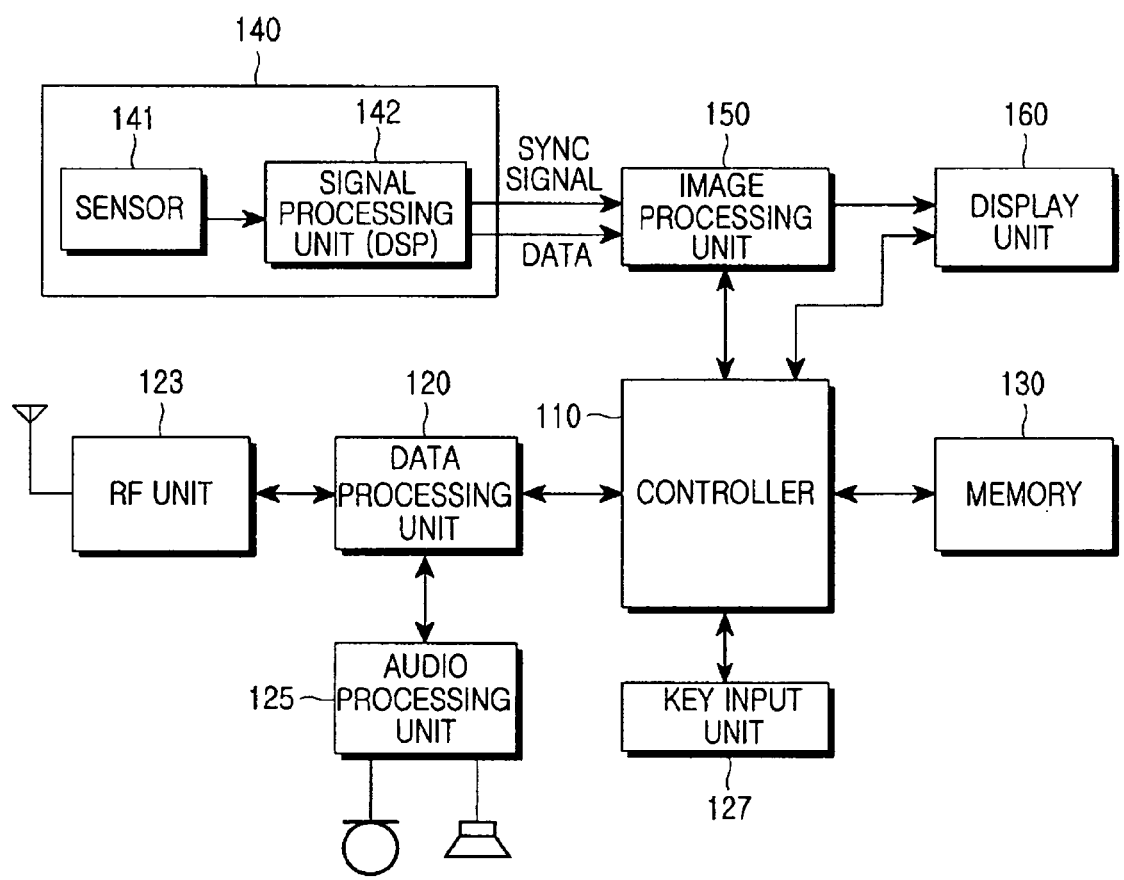
FIG. 1 is a block diagram illustrating the construction of a wireless terminal according to an exemplary embodiment of the present invention.

FIG. 1 is a block diagram illustrating the construction of a wireless terminal including a camera module according to an exemplary embodiment of the present invention.

A radio frequency (RF) unit 123 performs the wireless communication function of the wireless terminal. The RF unit 123 includes an RF transmitter (not shown) and an RF receiver (not shown). Within the RF unit 123, the RF transmitter up-converts and amplifies frequencies of a signal to be transmitted, and the RF receiver low-noise amplifies a received signal and down-converts the frequency of the received signal. A modem 120 includes a transmitter for encoding and modulating the signal to be transmitted and a receiver for demodulating and decoding the received signal. An audio processing unit 125 may include a codec, which contains a data codec for processing packet data and an audio codec for processing audio signals such as voice signals. The audio processing unit 125 converts a digital audio signal received from the modem 120 into an analog signal by means of the audio codec, thereby reproducing the converted analog signal. Also, the audio processing unit 125 converts an analog audio signal for transmission generated from a microphone into a digital audio signal by means of the audio codec, and transmits the converted digital audio signal to the modem 120. The codec may be separately constructed or the codec may be included in a controller 110.

A memory 130 may include a program memory and a data memory. The program memory may store programs for controlling general operations of the wireless terminal and programs for resizing an image output from a camera module so that the image has a size suitable for a display unit according to one exemplary embodiment of the present invention. The data memory temporarily stores data generated while the programs are being executed.

The controller 110 controls the entire operation of the wireless terminal. The controller 110 may include the modem 120 and the codec. According to an exemplary embodiment of the present invention, when the size of an image output from a camera module 140 differs from the screen size of a display unit 160, the controller 110 performs a control operation to resize the image output from the camera module 140 to a size suitable for the display unit 160.

A camera module 140 includes a camera sensor 141 and a signal processing section 142. The camera sensor 141 photographs an image and converts an optical signal, obtained through photographing, into an electric signal. The signal processing section 142 converts an analog image signal obtained through the photographing of the camera sensor 141 into digital data. It is assumed that the camera sensor is a CCD sensor, and the signal processing section 142 may include a digital signal processor (DSP). Also, the camera sensor 141 and the signal processing section 142 may be integrally or separately constructed. According to an exemplary embodiment of the present invention, the camera module 140 may output a 720×480 image.

An image processing unit 150 performs a function to generate image data for displaying an image signal output from the camera module 140. The image processing unit 150 processes an image signal, which is output from the camera module 140, in a unit of frame, and outputs the frame image data to be suitable for the screen size and the property of the display unit 160. Also, the image processing unit 150 includes a video codec to compress frame image data displayed on the display unit 160 by using a predetermined scheme and to restore original frame image data from compressed frame image data. The video codec may include a JPEG codec, an MPEG4 codec, and a Wavelet codec, among others. It is assumed that the image processing unit 150 has an OSD (On Screen Display) function and can output OSD data according to the size of a display screen under the control of the controller 110. According to an exemplary embodiment of the present invention, the image processing unit 150 resizes an image output from the camera module 140 so that the image has a size suitable for the display unit 160, and outputs the resized image to the display unit 160, under the control of the controller 110. According to another exemplary embodiment of the present invention, the image processing unit 150 may be included in the camera module 140. The image processing unit 150 resizes an image output from the camera module 140 so that the image has a size suitable for the display unit 160, and outputs the resized image to the display unit 160.

The display unit 160 displays an image signal output from the image processing unit 150 and user data output from the controller 110 on a screen. The display unit 160 may employ an LCD. When the LCD is employed, the display unit 160 may include an LCD controller, a memory for storing image data, and an LCD element among others. Where the LCD is realized in a touch screen scheme, the display unit 160 may serve as an input section. A key input unit 127 includes keys for inputting numeral and character information and function keys for setting various functions.

The operation of resizing an image in the wireless terminal with the above-mentioned construction will now be described in detail with reference to FIG. 2.

Figure 2:
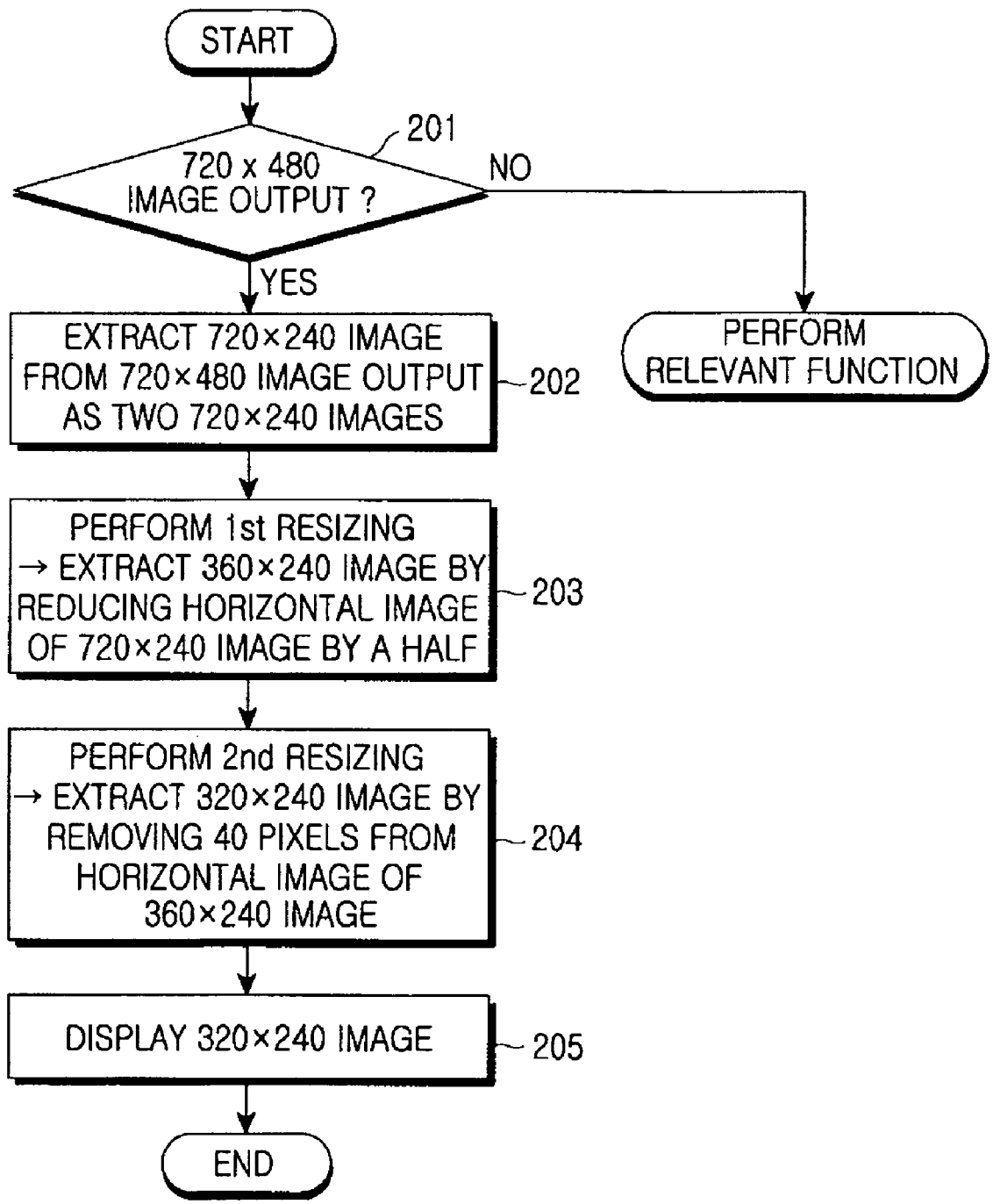
FIG. 2 is a flowchart illustrating a method for resizing an image output from a camera module so that the image has a size suitable for the display unit in the wireless terminal according to an exemplary embodiment of the present invention.
Figure 3A:
FIGS. 3A through 3C are views demonstrating the procedure of FIG. 2.
Figure 3B:
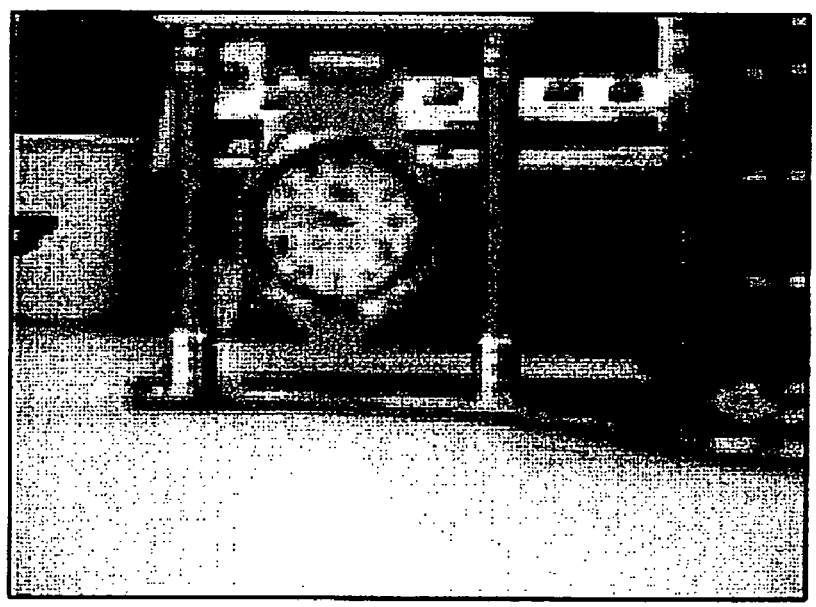
Figure 3C:
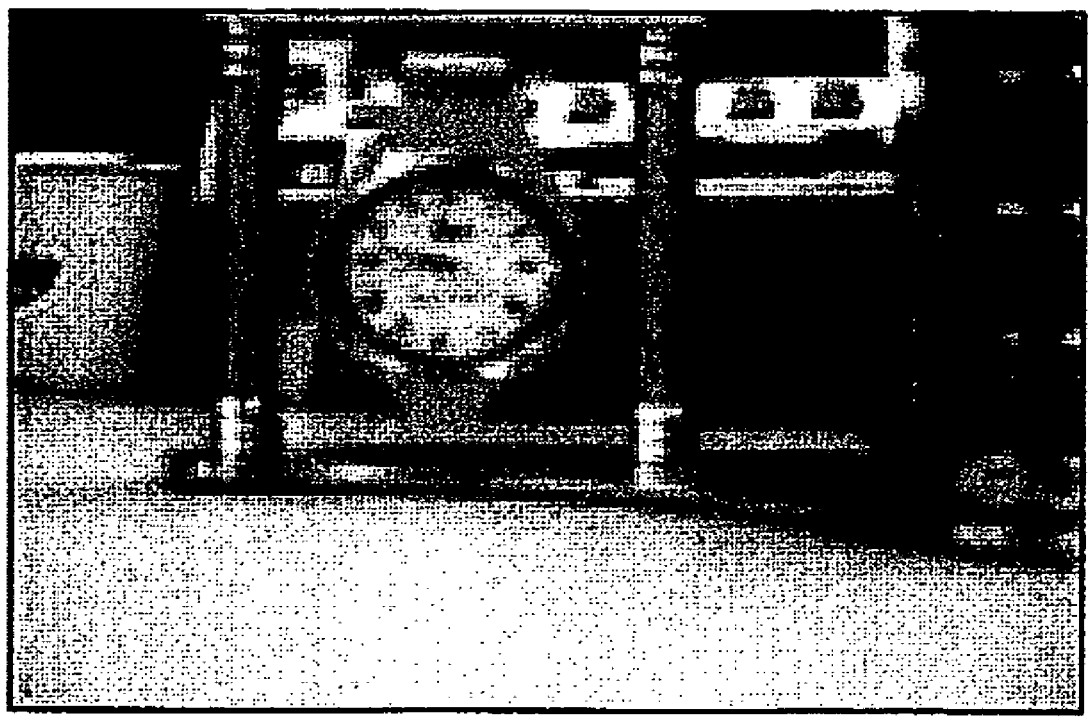

FIG. 2 is a flowchart illustrating a method for resizing an image output from a camera module such that the image has a size suitable for the display unit in the wireless terminal according to an exemplary embodiment of the present invention. FIGS. 3A through 3C are views demonstrating the procedure shown in FIG. 2. In the following description, it is assumed that an image output through the display unit of the wireless terminal has a size of 320×240.

Hereinafter, the resizing method according to an exemplary embodiment of the present invention will be described in detail with reference to FIGS. 1, 2, and 3A through 3C.

An image is output from the camera module 140 in a photographing mode of the wireless terminal and is detected by the controller 110. The controller 110 also determines the size of the image output from the camera module 140. The photographing mode includes a preview mode, a moving-picture recording mode for recording a moving picture, and a still-picture photographing mode for photographing a still picture, in which an image is output through the camera module 140.

Where the image output from the camera module 140 has a size of 320×240, which is the screen size of the display unit 160, the controller 110 detects the size, and controls the image output from the camera module 140 to be displayed on the display unit 160 through the image processing unit 150.

In contrast, when the image output from the camera module 140 has a size of 720×480, the controller 110 detects the size in step 201 and proceeds to step 202. In step 202, the controller 110 controls the 720×480 image being output as two 720×240 images so that only one 720×240 image is output to the image processing unit 150. FIG. 3A shows a 720×240 image output to the image processing unit 150 in step 202.

In step 203, the image processing unit 150 converts the 720×240 image output in step 202 into a 360×240 image through a first resizing process. For example, in step 203, the image processing unit 150 extracts a 360×240 image, by removing 360 pixels from 720 pixels constituting a horizontal image of the 720×240 image.

To remove 360 pixels from 720 pixels constituting the horizontal image, the image processing unit 150 may remove one pixel per two pixels or may randomly choose and remove 360 pixels from the 720 pixels, thereby resizing the 720×240 image to the 360×240 image. FIG. 3B shows a 360×240 image resized through the first resizing process in step 203.

In step 204, the image processing unit 150 converts the 360×240 image, which has been extracted through the first resizing process in step 203, into a 320×240 image through a second resizing process, under the control of the controller 110. In step 204, the image processing unit 150 extracts the 320×240 image, by removing 40 pixels from 360 pixels constituting a horizontal image of the 360×240 image.

To remove 40 pixels from 360 pixels constituting the horizontal image, the image processing unit 150 divides the 360 pixels constituting the horizontal image into nine groups having 40 pixels in each group, and removes 40 pixels included in one of the nine groups, thereby performing the second resizing process. For example, the image processing unit 150 may remove 40 pixels included in the fifth group of the nine groups, thereby resizing the 360×240 image to the 320×240 image. Also, the image processing unit 150 may randomly select and remove 40 pixels from the 360 pixels constituting the horizontal image, to resize the 360×240 image to the 320×240 image. FIG. 3C shows a 320×240 image resized through the second resizing process in step 204.

When the 320×240 image is extracted through the second resizing process in step 204, the controller 110 detects the image, and controls the image processing unit 150 so that the image resized to the size of 320×240 is displayed through the display unit 160.

As described above, exemplary embodiments of the present invention provide a method of resizing an image output from the camera module so that the image has a size suitable for the display unit, thereby preventing an image distortion phenomenon derived from mismatch of the aspect ratio.

While exemplary embodiments of the present invention have been shown and described with reference to certain exemplary embodiments thereof, it will be understood by those skilled in the art that various changes in form and details may be made therein without departing from the spirit and scope of the invention as defined by the appended claims.

What is claimed is:

1. A method for converting an image size in a wireless terminal, the method comprising the steps of:
   outputting two images from a camera module, whereby the two images are two interlaced fields of a television scanning scheme;
   determining a size of the images output from the camera module; extracting one image of the two images output from the camera module;
   resizing the size of the extracted image to a size suitable for a display unit through at least two resizing steps when the size of the image output from the camera module differs from the size of the image to be output through the display unit; and
   outputting the resized image,
   wherein resizing the extracted image comprises dividing columns of pixels of the image into a plurality of groups of columns based on a pattern of the columns, and removing one of the plurality of groups of columns.

2. A method for converting an image size in a wireless terminal, the method comprising the steps of:
   outputting two 720×240 images from a camera module, whereby the two 720×240 images are two interlaced fields of a television scanning scheme;
   determining a size of the images output from the camera module;
   extracting one 720×240 image of the two 720×240 images output from the camera module;
   resizing the extracted 720×240 image to a 320×240 image to be output through a display unit through at least two steps when the camera module has output the 720×480 image; and
   outputting the 320×240 image,
   wherein resizing the extracted 720×240 image comprises dividing columns of pixels of the image into a plurality of groups of columns based on a pattern of the columns, and removing one of the plurality of groups of columns.

3. The method as claimed in claim 2, wherein the resizing and outputting step further comprises:
   first-resizing the 720×240 image to a 360×240 image; and
   second-resizing the 360×240 image resized through a first-resizing step to a 320×240 image.

4. The method as claimed in claim 3, wherein, in the first-resizing step, 720 pixels constituting a horizontal image of the 720×240 image are reduced by half, whereby the 720×240 image is resized to the 360×240 image.

5. The method as claimed in claim 4, wherein one per two pixels is removed in the 720 pixels constituting the horizontal image, whereby the 720×240 image is resized to the 360×240 image.

6. The method as claimed in claim 4, wherein 360 pixels are randomly selected and removed from the 720 pixels constituting the horizontal image, whereby the 720×240 image is resized to the 360×240 image.

7. The method as claimed in claim 3, wherein, 40 pixels are removed from 360 pixels constituting a horizontal image of the 360×240 image in a second resizing, thereby resizing the 360×240 image to the 320×240 image.

8. The method as claimed in claim 7, wherein the 360 pixels constituting the horizontal image are divided into nine groups comprising 40 pixels in each group, and 40 pixels comprised in at least one of the nine groups are removed, thereby resizing the 360×240 image to the 320×240 image.

9. The method as claimed in claim 7, wherein 40 pixels are randomly selected and removed from the 360 pixels constituting the horizontal image, thereby resizing the 360×240 image to the 320×240 image.

10. A wireless terminal comprising:
    a controller for determining a size of an image output from a camera module, whereby the camera module outputs two images as two interlaced fields of a television scanning scheme;
    an image processing unit for extracting one image of the two images output from the camera module, and for resizing the extracted image output to a size suitable for a display unit through at least two resizing steps when the size of the extracted image differs from the size of the image to be output through the display unit,
    wherein the image processing unit divides columns of pixels of the image into a plurality of groups of columns based on a pattern of the columns, and removes one of the plurality of groups of columns; and a display unit for outputting the resized image.

11. The wireless terminal as claimed in claim 10, wherein the image processing unit extracts one 720×240 image from the 720×480 image comprising two 720×240 images when the camera module outputs the 720×480 image, and outputs the extracted 720×240 image.

12. The wireless terminal as claimed in claim 11, wherein the image processing unit converts the extracted 720×240 image to a 360×240 image and converts the 360×240 image to a 320×240 image.

* * * * *